UNITED STATES PATENT OFFICE.

VICTOR DUBOIS AND WILLIAM C. STEWART, OF HARVEY, ILLINOIS.

PROCESS OF ENAMELING SHEET-METAL WARE.

SPECIFICATION forming part of Letters Patent No. 498,207, dated May 23, 1893.

Application filed February 27, 1893. Serial No. 463,937. (Specimens.)

*To all whom it may concern:*

Be it known that we, VICTOR DUBOIS, a subject of the Queen of Great Britain, and WILLIAM C. STEWART, a citizen of the United States, residing at Harvey, in the county of Cook and State of Illinois, have invented certain new and useful Improvements in Processes of Enameling Sheet-Metal Ware; and we do hereby declare the following to be a full, clear, and exact description of the invention, which will enable others skilled in the art to which it appertains to make and use the same.

Our present invention relates, to various new and useful improvements in processes of enameling articles of sheet metal ware, whereby an attractive mottled or variegated appearance of the coat thereof will be produced.

Heretofore and prior to our invention, many enameling processes have been devised and described and put into practical use.

In order that the particular merits and advantages of our improved process may be fully understood, we will briefly and generally refer to the processes which have preceded the present process, pointing out the objections which are attendant on said prior processes, and wherein those objections are over-come by our present process.

Prior to our invention, articles of manufacture have been enameled by well known processes in one solid color, such as gray or blue or white. The particular objection to these particular processes is that the artistic effect of the enamel coat becomes seriously impaired by any slight imperfections in the surface of the coat or by specks of foreign matter within the coat, or by discoloration of the coat from any cause whatever. For this reason the number of imperfect goods or goods of second quality is too large compared with perfect goods manufactured to make these processes capable of being economically put into use. These objections to a plain coating process being known, it becomes necessary to make use of a variegated, marbled, peppered or mottled coating, whereby any imperfection or discoloration would not be noticeable and whereby a much more attractive article might be produced by reason of the contrast of the different colors of the coats.

One well known process of manufacturing mottled ware consists in oxidizing or rusting the iron by the application of an acid to the surface of the article before the application of the first coat, the oxidation thereof being further increased by the introduction of an acid in said first coat. We consider this process to be objectionable, as the durability of the ware is considerably affected by the oxidation of the iron base.

Another well known way of producing mottled or variegated ware consists in introducing oxide of iron, or iron scale, or other comminuted particles of sufficient lightness to be held in suspension in one or both of the enamel coats, whereby the said oxide of iron, iron scale, or other comminuted particles will be observable through the transparent enamel coat in the form of dark colored or mottled spots. We consider that the presence of foreign and infusible matter in the enamel coating impairs and weakens the solidity of the latter, and that therefore this process is objectionable.

Another well known process of producing mottled, or to speak more correctly, marbleized ware, is to apply a final coat or glaze of a contrasting color to the base coat, and after the application thereof, in shaking or agitating the article so that the final coat will form in veins and streaks upon the base coat. This process is attended with the objection that the resultant coating is uneven and irregular to the touch, whereby the effects of light and shade thereon give this article an imperfect and unfinished appearance. In our improved process we have overcome all of these objections, as we shall presently describe.

By means of our improved process we give a mottled or variegated appearance to the enamel coat without the use of an acid for oxidizing the metal base or without the introduction in the enamel coat of oxide of iron, iron scale, or other comminuted particles, or without the application of a final contrasting partial coat. The various steps to be followed in carrying our process into effect will now be described.

The article which is to be enameled, and which is stamped or otherwise formed of sheet iron or steel, is first carefully annealed, scaled, pickled, scoured, thoroughly washed or otherwise cleaned, to form a smooth and clear surface for the application of the first, ground, or foundation coat. Our present invention does not relate in any way to the composition of this first coat and it is unnecessary to mention any particular formula of ingredients for the same. The said first, ground, or foundation coat may be of any of the well known compositions for producing an opaque or plain colored ground for the reception of the succeeding coats. This first, ground, or foundation coat is applied to the article in any manner, either by dipping the article into a vat containing the composition or by spreading the composition over the article by means of a brush, or in any other way. If this foundation or ground coat is to be applied in the form of a powder, crystals, or particles, the article may be first coated with gum or water and the foundation coat sprinkled thereon and then burned so as to melt and form a glaze over the article. The application of the ground or foundation coat in the form of a powder, as we have just mentioned, is attended with many objections and is now entirely supplanted by the application thereof in the form of a paste or liquid. We wish it to be understood, however, that we contemplate in the present invention, any and all known means of applying any variety or kind of ground or foundation coat to any iron or steel article of manufacture. The first coat having been fired and glazed to the article, we then prepare a second enamel coat which is preferably gray in color and is spread over the first, ground, or foundation coat in any well known way. We do not limit ourselves to any particular color for this second coat and the color which we have mentioned is only one of a great many which may be used. Regarding the composition of this second enamel coat, we wish it also understood that any well known enamel formula may be followed. We have used in our business with good results a composition composed of the following: feldspar, kryolite, oxide of tin, oxide of iron, borax and soda in varying proportions according to the shade desired, but any other well known and desirable enameling composition which may suggest itself to any one skilled in the art, can be used with equally good results. The article having been coated with this second enamel coat is placed in a drying oven at a temperature of about 160° in the usual manner. After having been dried as we have just described, the article is removed from the oven and presents the appearance of well known biscuit ware, the enameling composition thereon being sufficiently hard to be handled without danger of cracking or breaking, and being porous enough to readily absorb any liquid which may be placed thereon.

So far as we have described our process it is substantially like many well known processes of enameling, in which processes however, the article would now be taken and fired so that the two coats would be glazed thereon. The second enamel coating having been dried to produce the appearance of biscuit ware, as we have just described, we propose at this point to make use of an entirely new and novel step in the process for enameling to produce mottled ware. We take the article in this condition and apply to the dry, porous, unglazed, second enamel coat, a suitable volatile liquid, applied thereto in irregular spots or mottles. This volatile liquid may be applied to the second coat by means of a syringe, or by a spray, or by hand, or in any other suitable way, whereby the desired result will be accomplished. With regard to the composition of this volatile liquid we have found that the same result can be accomplished by the use of many substances. In experimenting therewith, we have found that water unmixed with any other liquid or a composition of water and borax accomplishes all that is necessary. Concerning this volatile liquid therefore, we wish our description herein to be understood as covering any liquid, colored or uncolored, or colorless, sufficiently thin to be absorbed by the second enamel coat, and sufficiently volatile to be evaporated therefrom during the process of drying. The said volatile liquid of any composition being applied to the second coat, the article is again placed in an oven and is dried in any suitable way, so that the said volatile liquid will be evaporated or volatilized. After this second drying, the volatile liquid having been volatilized by the heat, there will be only a faint impression left in the form of lines, spots, and mottles, but in the furnace these are developed so that after the article is finally fired, which is now done, it will be found to present the desired variegated or mottled appearance by reason of the lines or markings produced by the volatile liquid applied as heretofore described. It will of course be understood that two or more enamel coats may be applied to the foundation coat and that any one or all of these enamel coats may be mottled or spotted by the application thereto of the volatile liquid as we have before described.

From the above description, the particular advantages of our improved process can be readily understood. We do not oxidize the iron vessel nor make use of an acid in the foundation coat for that purpose, neither do we apply oxide of iron, or iron scale, or other comminuted particles to the metal base, and neither do we apply a contrasting partial coat to the enamel coat, whereby and by means of which it will be seen that the objections we have before pointed out as being attendant on certain particular prior processes are overcome.

Having now described our invention, what we claim as new therein, and desire to secure by Letters Patent, is as follows:

An improved process of enameling articles of iron or steel ware which consists in applying a foundation or ground coating thereto; then in burning said ground coating; then in applying an enamel coating of any desired color; then in drying said enamel coating; then in applying a volatile liquid to said enamel coating; then in volatilizing or evaporating said volatile liquid, whereby variegated or mottled spots will be formed on said enamel coating; and finally in burning said enamel coating; substantially as described.

In testimony whereof we affix our signatures in presence of two witnesses.

VICTOR DUBOIS.
WILLIAM C. STEWART.

Witnesses:
C. T. McKEE,
J. T. MERCER.